United States Patent
Haga et al.

(10) Patent No.: US 7,993,582 B2
(45) Date of Patent: Aug. 9, 2011

(54) SULFUR PURGE CONTROL DEVICE FOR AN INTERNAL COMBUSTION ENGINE

(75) Inventors: Hisao Haga, Wako (JP); Norio Suzuki, Wako (JP); Katsuji Wada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1042 days.

(21) Appl. No.: 11/882,406

(22) Filed: Aug. 1, 2007

(65) Prior Publication Data
US 2008/0039975 A1    Feb. 14, 2008

(30) Foreign Application Priority Data
Aug. 8, 2006  (JP) .................... 2006-216008

(51) Int. Cl.
*G01N 21/00*   (2006.01)
*F01N 1/00*    (2006.01)
*G01M 15/00*   (2006.01)
*G01N 7/00*    (2006.01)

(52) U.S. Cl. ........ 422/62; 422/83; 73/23.32; 73/114.72; 60/272; 60/276; 60/286; 60/299; 60/302; 60/311

(58) Field of Classification Search .................. None
See application file for complete search history.

(56) References Cited

U.S. PATENT DOCUMENTS

| 6,779,339 B1 | 8/2004 | Laroo et al. |
| 2003/0051469 A1 | 3/2003 | Loerch et al. |
| 2005/0222748 A1* | 10/2005 | Naik et al. .................... 701/103 |

FOREIGN PATENT DOCUMENTS

| DE | 100 17 203 A1 | 10/2001 |
| EP | 0 869 263 A1 | 10/1998 |
| EP | 1 106 798 A1 | 6/2001 |
| EP | 1 529 933 A1 | 5/2005 |
| JP | 2000-064824 A | 2/2000 |
| JP | 2000-145522 A | 5/2000 |
| JP | 2003-120373 A | 4/2003 |
| JP | 2003-293747 A | 10/2003 |
| JP | 2004-190668 A | 7/2004 |
| JP | 2004-204812 A | 7/2004 |
| JP | 2005-233017 A | 9/2005 |

* cited by examiner

*Primary Examiner* — Jill Warden
*Assistant Examiner* — Neil Turk
(74) *Attorney, Agent, or Firm* — Arent Fox LLP

(57) ABSTRACT

Provided is a control device for an internal combustion engine that can execute a sulfur purge in a favorable manner under all conditions without complicating the control action or the engine structure. The process comprises detecting a temperature of the NOx catalytic converter, detecting an exhaust air fuel ratio in the catalytic converter, computing a target exhaust air fuel ratio according to a detected temperature of the NOx catalytic converter, and controlling a fuel injection valve so as to make an actual exhaust fuel ratio agree with the target exhaust air fuel ratio. If the temperature of the NOx catalytic converter is not high enough to enable a sulfur purge, a temperature increase control is executed to increase the temperature of the NOx catalytic converter by suitably changing various engine parameters.

18 Claims, 5 Drawing Sheets

SULFUR PURGE CONTROL DEVICE FOR AN INTERNAL COMBUSTION ENGINE

TECHNICAL FIELD

The present invention relates to a control device for an internal combustion engine, and in particular to a control device for executing a process for removing sulfur contents from a catalytic converter for eliminating nitrogen oxides from exhaust gas.

BACKGROUND OF THE INVENTION

The exhaust passage of a diesel engine is sometimes fitted with a lean NOx catalytic converter (referred to as LNC hereinafter) for reducing and eliminating nitrogen oxides (referred to as NOx hereinafter) from the exhaust gas. In an LNC, NOx is absorbed when the air fuel ratio of the exhaust gas (referred to exhaust A/F hereinafter) is higher than a prescribed level (referred to as a lean condition hereinafter) or when the oxygen content of the exhaust gas is high, and the absorbed NOx is released and reduced to a harmless form when the exhaust A/F is higher than the prescribed level (referred to as a rich condition hereinafter) or when the oxygen content of the exhaust gas is low. Because the capability of the LNC to absorb NOx diminishes as the build up of the NOx therein increases, the combustion state is varied so that the concentration of the reducing agents such as CO and HC is increased while the oxygen concentration is decreased. Thereby, the release of NOx from the LNC is enhanced, and the reduction of the NOx is promoted.

Because the fuel includes sulfur contents, sulfur oxides (referred to as SOx hereinafter) and hydrogen sulfide (referred to as $H_2S$ hereinafter) are also emitted with the exhaust gas. When such sulfur contents are absorbed by the LNC (referred to as sulfur poisoning hereinafter), the capability of the LNC to absorb NOx diminishes. Therefore, it is necessary to release the sulfur contents absorbed in the LNC from time to time. The process of releasing sulfur contents from a LNC (referred to as sulfur purging hereinafter) requires that the temperature of the LNC and air fuel ratio of the exhaust gas are both at appropriate levels. It is known that it can be achieved by carrying out a secondary fuel injection following the combustion (referred to as post injection hereinafter) in addition to the main fuel injection that is carried out during the intake stroke of the engine to increase the temperature of the LNC and injecting a prescribed amount of fuel serving as a reducing agent into the exhaust gas under a feedback control based on the output of the air fuel ratio sensor to maintain the exhaust air fuel ratio at a prescribed rich level (see Japanese patent laid open publication Number 2003-120373).

It is also known to conduct a post fuel injection to control the exhaust air fuel ratio in such a manner as to execute a favorable sulfur purging (see Japanese patent laid open publication Number 2004-204812).

However, as the method described in Japanese patent laid open publication Number 2003-120373 requires that the catalyst temperature increase control by a post fuel injection and the enriching control for the exhaust air fuel ratio by supplying a reducing agent are required to be executed individually, the control structure is complex, and the need for an injection valve in the exhaust passage for the supply of the reducing agent complicates the engine structure.

According to the technology described in Patent Document #2, because the control target value of the exhaust air fuel ratio is fixed in advance, the control action may not be necessarily suitable for each particular condition of the LNC, and the sulfur purge cannot be executed in an optimum fashion under all conditions.

BRIEF SUMMARY OF THE INVENTION

In view of such problems of the prior art, a primary object of the present invention is to provide a control device for an internal combustion engine that can execute a sulfur purge in a favorable manner under all conditions without complicating the control action or the engine structure.

A second object of the present invention is to provide a control method for an internal combustion engine that can execute a sulfur purge in a favorable manner under all conditions without complicating the control action or the engine structure.

To achieve such an object, the present invention provides a control device for an internal combustion engine provided with a NOX catalytic converter in an exhaust passage thereof, comprising: a temperature sensor for detecting a temperature of the NOx catalytic converter; an air fuel ratio detector for detecting an exhaust air fuel ratio in the catalytic converter; a fuel injection control unit for controlling an amount of fuel injection; and an engine control unit for computing a target exhaust air fuel ratio according to an output of the temperature sensor (and a requirement of a sulfur purge process) and forwarding a command to the fuel injection control unit so as to make an output of the air fuel ratio detector agree with the target exhaust air fuel ratio. The present invention also provides a method for controlling a sulfur purge in an internal combustion engine provided with a NOX catalytic converter in an exhaust passage thereof, comprising: detecting a temperature of the NOx catalytic converter; detecting an exhaust air fuel ratio in the catalytic converter; computing a target exhaust air fuel ratio according to a detected temperature of the NOx catalytic converter (and a requirement of a sulfur purge process); and controlling a fuel injection valve so as to make an actual exhaust fuel ratio agree with the target exhaust air fuel ratio.

Thus, according to the present invention, the temperature of the NOX catalytic converter can be always kept within a temperature range suitable for sulfur purging by making the target air fuel ratio richer and reducing the supply of oxygen so as to restrict the heat generating reaction when the temperature of the NOX catalytic converter is high, and making the target air fuel ratio leaner and increasing the supply of oxygen so as to promote the heat generating reaction when the temperature of the NOX catalytic converter is low.

The exhaust air fuel ratio can be adjusted by controlling an amount of a main fuel injection or an amount of a post fuel injection.

According to a preferred embodiment of the present invention, the engine control unit executes a temperature increase control based on any combination of delaying a main fuel injection, increasing an amount of post fuel injection and reducing an intake flow rate when an output of the temperature sensor indicates a temperature lower than a first target temperature. The target air fuel ratio may be intermittently changed, by controlling the main fuel injection and/or the post fuel injection, to a leaner value when an output of the temperature sensor indicates a temperature higher than the first target temperature but lower than a second target temperature. Thereby, when the temperature goes out of the range suitable for sulfur purging, the air fuel ratio is temporarily made leaner so that an increased amount of oxygen may be supplied and the temperature of the NOX catalytic converter may be promptly increased.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
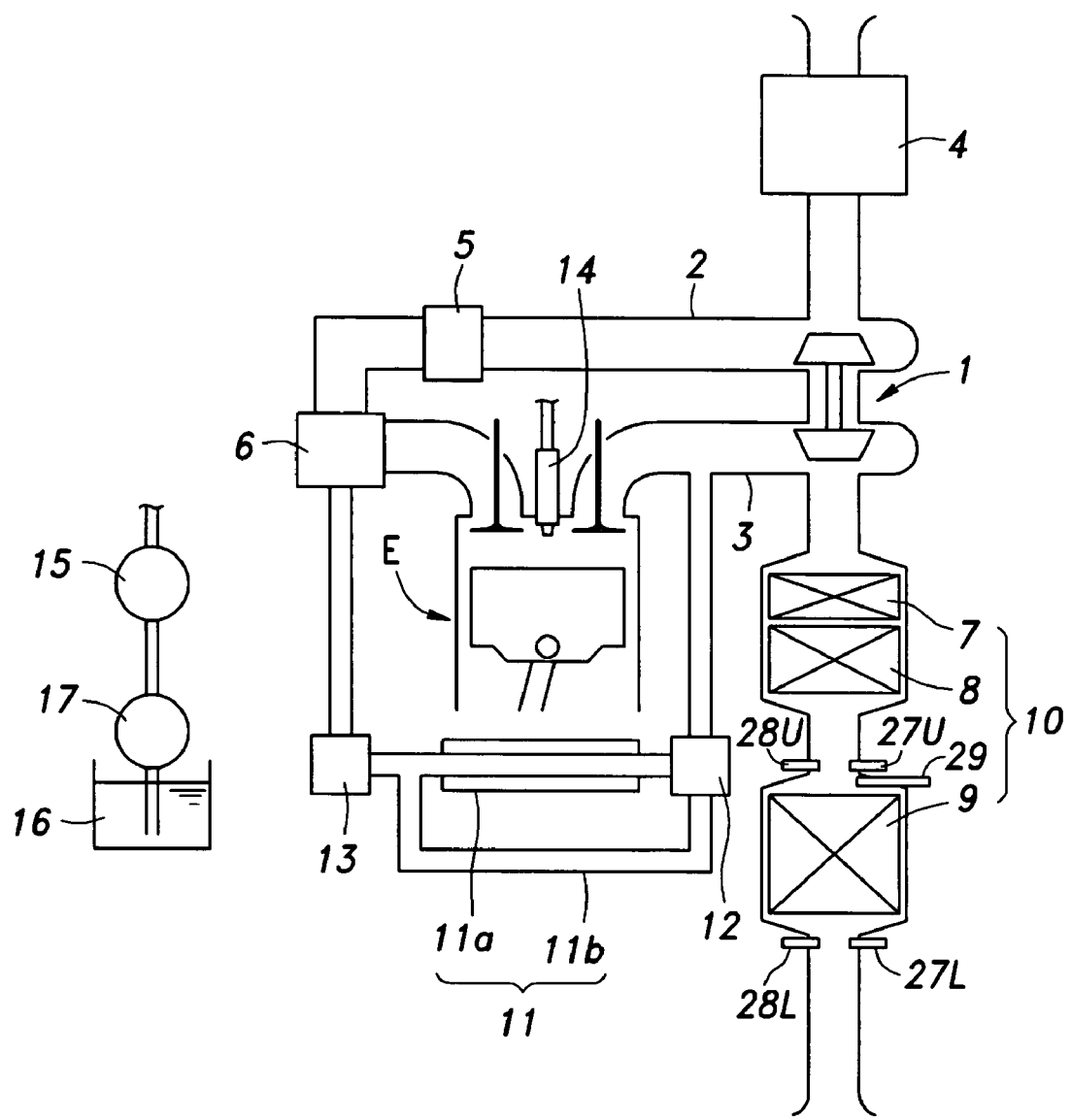
FIG. 1 is an overall structural view of an internal combustion engine to which the present invention is applied.

FIG. 1 is a view showing the basic structure of an internal combustion engine E to which the present invention is applied. This engine (diesel engine) E is not different from conventional engines as far as the mechanical structure is concerned, and is provided with a turbocharger 1 equipped with a variable boost pressure mechanism. An intake passage 2 is connected to a compressor end of the turbocharger 1, and an exhaust passage 3 is connected to a turbine end of the turbocharger 1. An air cleaner 4 is connected to the upstream end of the intake passage 2, and an intake control valve 5 for controlling the flow rate of the fresh air that flows into a combustion chamber and a swirl control valve 6 for increasing the flow speed of the intake flow by restricting the cross sectional area of the passage under a low speed, partial load condition are provided in appropriate parts of the intake passage 2. To the downstream end of the exhaust passage 3 is connected an exhaust cleaning system 10 comprising a diesel oxidation catalytic converter (DOC) 7, a diesel particulate filter (DPF) 8 for removing particulate substances such as soot and a lean NOx catalytic converter (LNC) 9 discussed above that are connected in that order.

The swirl control valve 6 and a part of the exhaust passage 3 immediately downstream of the combustion chamber are connected to each other via an exhaust gas recirculating (EGR) passage 11. The EGR passage 11 comprises a cooler passage 11a and a bypass passage 11b that bifurcate at a switching valve 12 (provided at an exhaust end thereof) and merge at an EGR control valve 13 (provided at an intake end thereof) for controlling the amount of EGR gas that flows into the combustion chamber.

The cylinder head of the internal combustion engine E is provided with a fuel injection valve 14 having a free end projecting into the combustion chamber. This fuel injection valve 14 is connected to a common rail 15 which is in turn connected to a fuel pump 17 and receives fuel at a prescribed high pressure. The fuel pump 17 is actuated by the crankshaft and draws fuel from a fuel tank 16.

Figure 2:
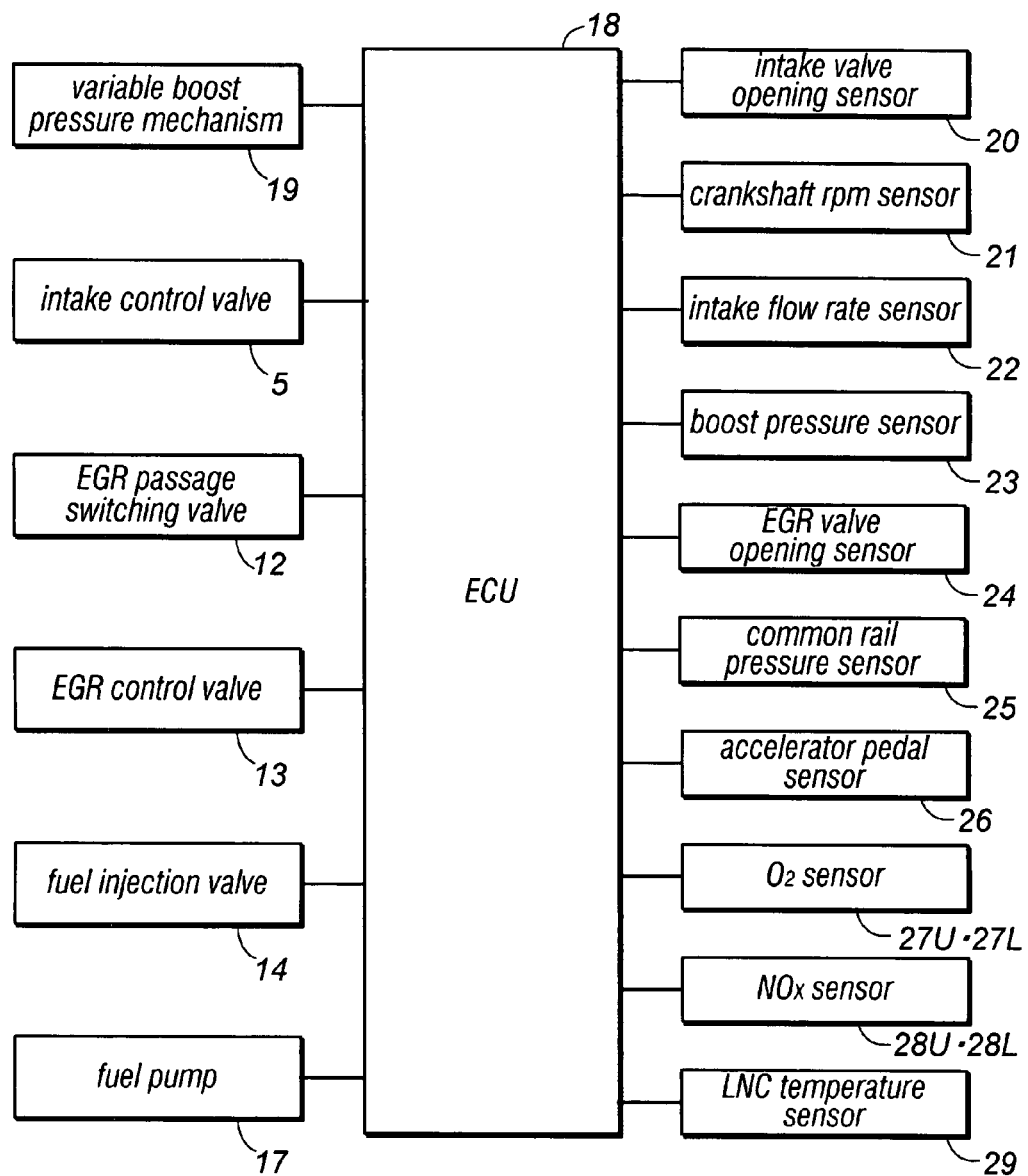
FIG. 2 is a block diagram of the engine control unit according to the present invention.

The variable boost pressure mechanism 19, intake control valve 5, EGR passage switching valve 12, EGR control valve 13, fuel injection valve 14, fuel pump 17 and so on are configured to operate according to control signals forwarded from an electronic control unit (ECU) 18 (see FIG. 2).

The ECU 18 in turn receives output signals from an intake valve opening sensor 20, crankshaft rotational speed sensor 21, intake flow rate sensor 22, boost pressure sensor 23, EGR valve opening sensor 24, common rail pressure sensor 25, accelerator pedal sensor 26, $O_2$ sensors 27U and 27L, NOx sensors 28U and 28L, LNC temperature sensor 29 and so on.

The memory of the ECU 18 stores maps for the target values of various control objects including an optimum fuel injection for each given crankshaft rotational speed and torque demand (accelerator pedal displacement) which is typically determined experimentally so that the various control objects may be optimally controlled and an optimum combustion state may be achieved under all load conditions of the internal combustion engine E.

Figure 3:
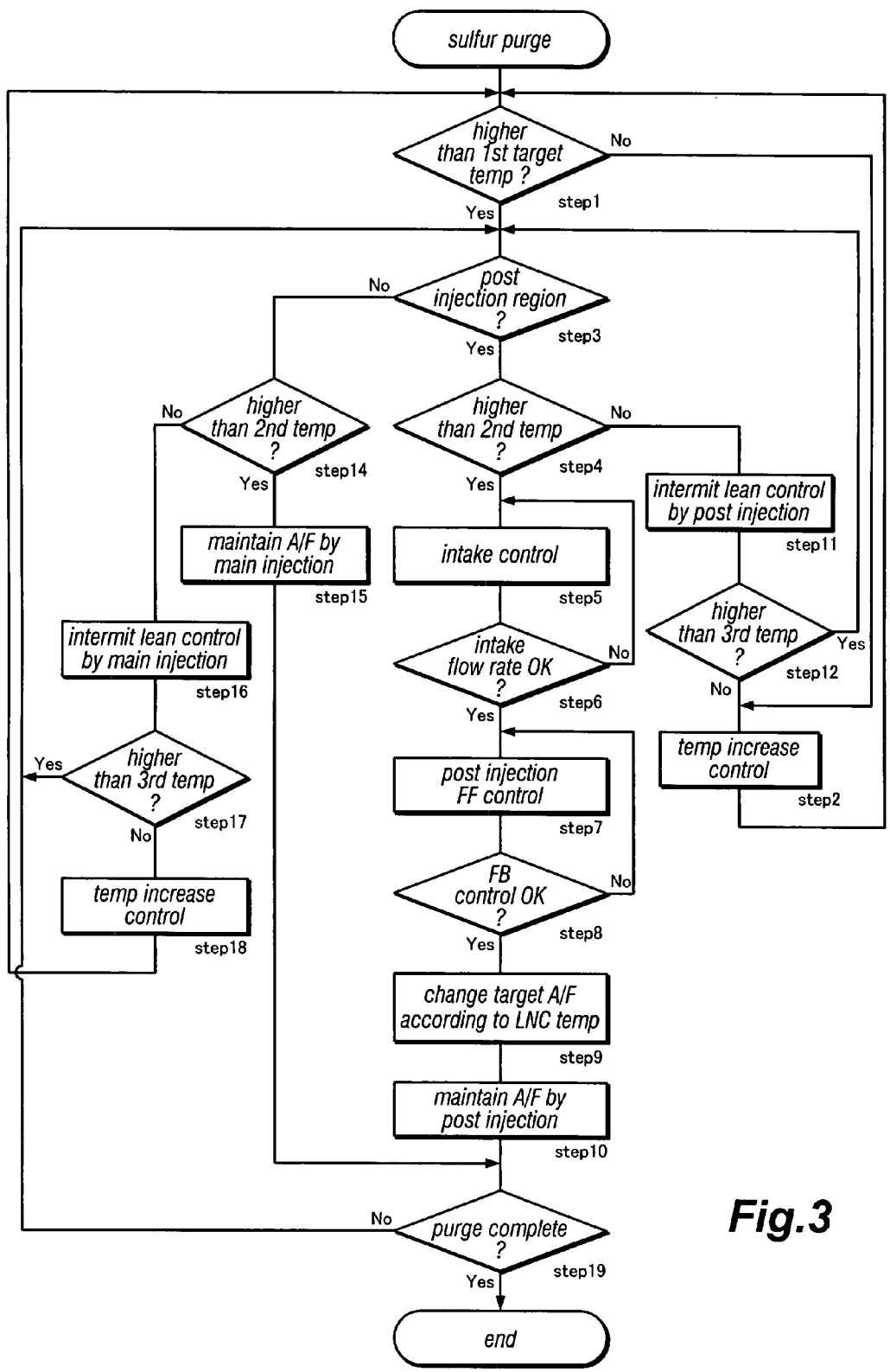
FIG. 3 is a control flowchart according to the present invention.

The control flow relating to the sulfur purge action of the present invention is described in the following with reference to FIG. 3. This process is executed when an estimated value of the extent of the sulfur poisoning of the LNC 9 has exceeded a prescribed threshold level, and this estimation is based on the traveling mileage of the vehicle, time duration of engine operation, fuel consumption, oxygen concentration and so on. First of all, it is determined from the output of the LNC temperature sensor 29 provided upstream of the LNC 9 if the temperature of the LNC 9 has reached a first target temperature (500° C., for instance) above which the execution of sulfur purging may be enabled (step 1). If the output of the LNC temperature sensor 29 is below the first target temperature, a sulfur purge is not initiated and a temperature increase control is executed until the first target temperature is reached (step 2).

The temperature increase control consists of a feedback control for maintaining the LNC temperature at a level suitable for a sulfur purge by suitably combining the delaying of the main injection timing, increasing the post injection and reducing the intake air. Thereby, a LNC temperature suitable for a sulfur purge can be reached promptly.

Figure 4:
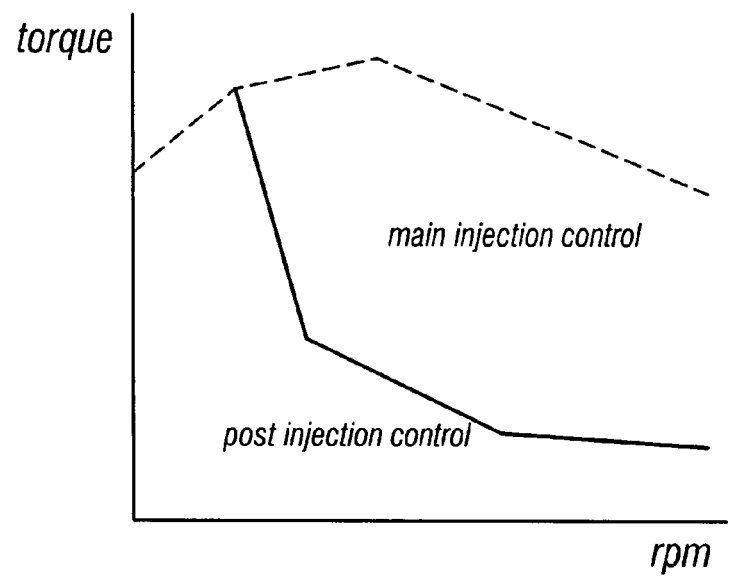
FIG. 4 is a conceptual diagram of the control region determining map.

If the temperature of the LNC 9 is found to be higher than the first target temperature (500° C.), it is determined if the current operating condition is in a region designated for a rich control using a post fuel injection by looking up a control region determining map (FIG. 4) which is prepared in advance with respect to the crankshaft rpm and torque demand or the load condition of the internal combustion engine E (step 3).

If the current operating condition is determined to be in the post fuel injection control region, it is then determined if the temperature of the LNC 9 has reached a second target temperature (450° C., for instance) above which the execution of sulfur purging in an environment richer than the stoichiometric condition may be enabled (step 4).

If the LNC temperature is determined to be above the second target temperature, the intake flow is controlled with the intake control valve 5 by looking up an intake flow rate map for the post fuel injection control region which is prepared in advance (step 5), and an exhaust air fuel ratio control using a post fuel injection is executed upon detecting that the intake flow rate has reached a prescribed level (step 6). The exhaust air fuel ratio control using a post fuel injection includes executing a feedforward control of the amount of the post fuel injection based on a feedforward control map which is prepared in advance (step 7). Upon determining that the exhaust air fuel ratio suitable for the feedback control has been reached (step 8), an exhaust air fuel ratio target value corresponding to the LNC temperature (step 9) is set, and the control process moves on to the feedback control for maintaining the LNC temperature suitable for a sulfur purge (step 10). The actual exhaust air fuel ratio is obtained from the output of the upstream O$_2$ sensor 27U. The feedforward control and feedback control are combined because the deviation of the actual exhaust air fuel ratio from the target value tends to be excessive immediately after the start of the rich control based on the adjustment of the amount of fuel injection. If the feedback control were executed from the beginning of the rich control, there would be an increased tendency for overshooting and hunting.

Figure 5:
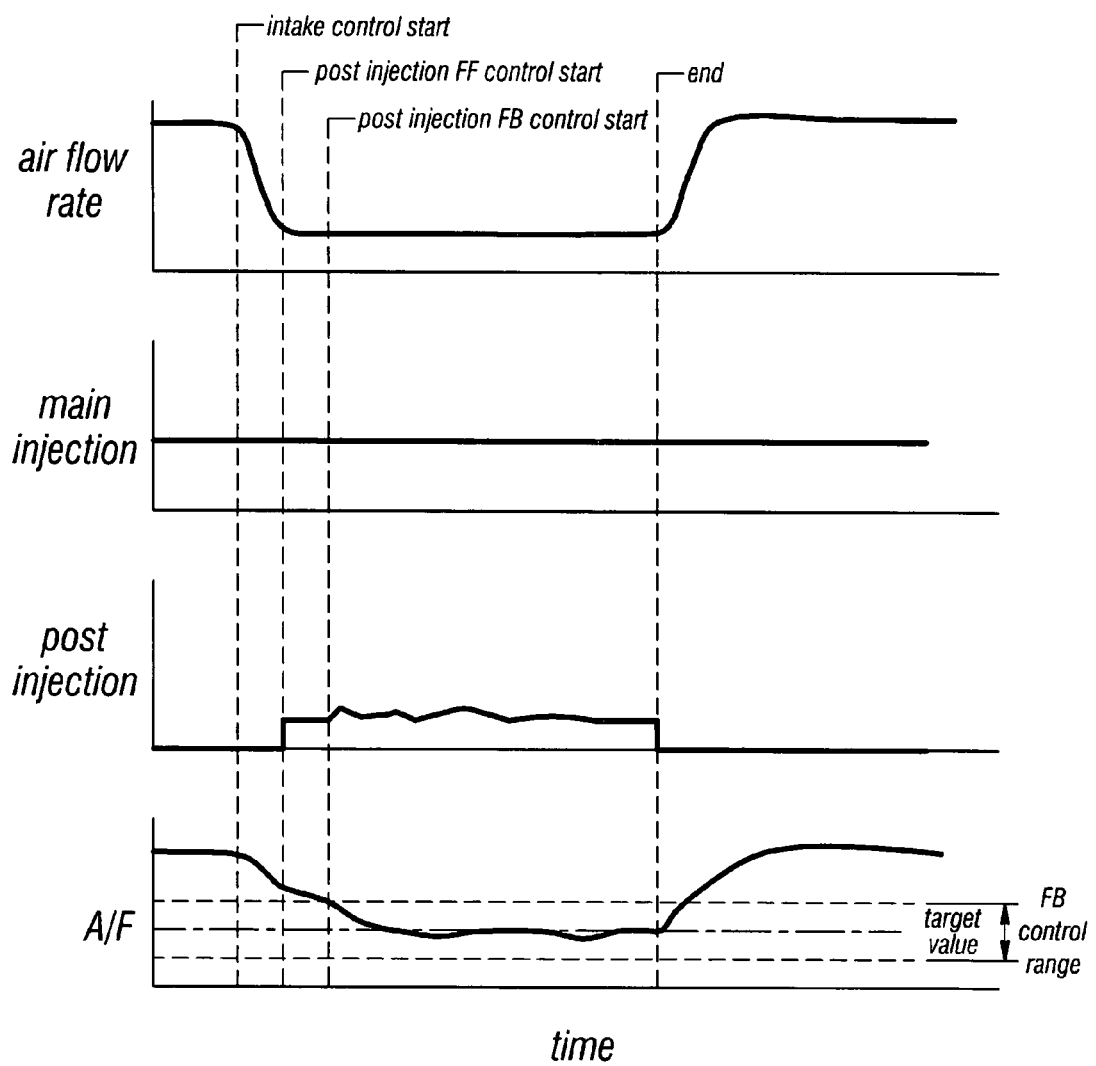
FIG. 5 is a control timing chart according to the present invention.

A timing chart for this control process is given in FIG. 5.

Figure 6:
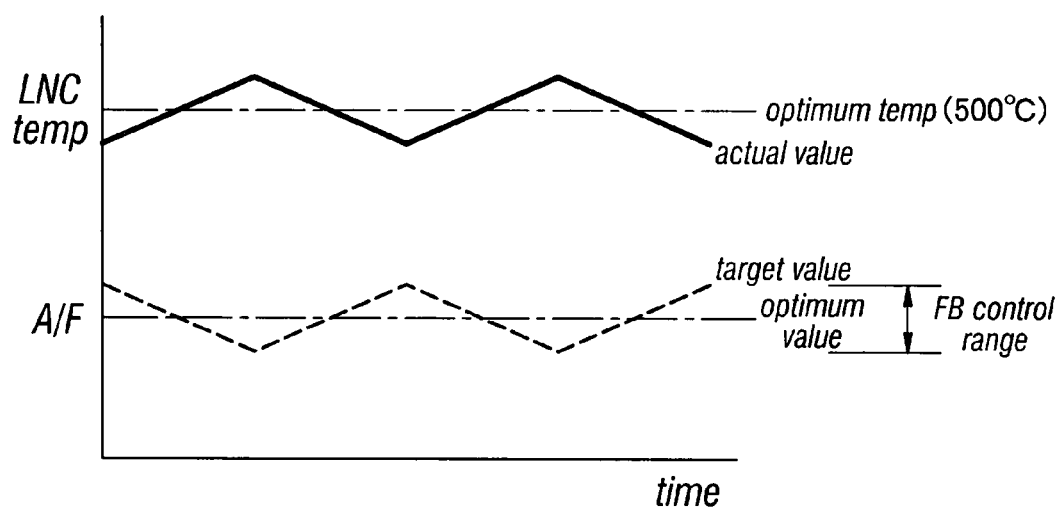
FIG. 6 is a conceptual diagram showing the relationship between the exhaust air fuel ratio target value and LNC temperature.

The changing of the exhaust air fuel ratio target value according to the LNC temperature is executed as shown in FIG. 6. If the actual LNC temperature is lower than the temperature range suitable for a sulfur purge, the exhaust air fuel ratio target value is changed to a value corresponding to the amount of O$_2$ that is required for increasing the temperature (shifting toward a leaner side) so as to achieve an optimum temperature before the feedback control for the post fuel injection is executed. Conversely, if the actual LNC temperature is higher than the optimum temperature, the exhaust air fuel ratio target value is changed to a value corresponding to the amount of O$_2$ that is required for decreasing the temperature (shifting toward a richer side) so as to achieve an optimum temperature before the feedback control for the post fuel injection is executed.

By thus executing a feedback control of the post fuel injection by changing the exhaust air fuel ratio target value according to the actual temperature of the LNC 9, it becomes possible to maintain an optimum temperature suitable for a sulfur purge in a prescribed rich environment.

As there is an optimum range of the exhaust air fuel ratio for executing a sulfur purge (feedback control range) having a certain width, the feedback control is executed by varying the exhaust air fuel ratio target value within this range.

If the output value of the LNC temperature sensor 29 is determined as not having reached the second target temperature in step 4, the temperature is increased by executing an intermittent lean control using a post fuel injection (step 11). This intermittent lean control consists of rapidly increasing the LNC temperature by making the environment, which is richer than the stoichiometric condition, intermittently leaner and temporarily supplying an increased amount of O$_2$ and executing a sulfur purge when an adequately rich state is restored. As the amount of O$_2$ that is required for the temperature increase depends on the LNC temperature, the time duration of the action for making the exhaust gas leaner is varied depending on the LNC temperature.

If it is determined that this intermittent lean control has failed to increase the temperature, and the LNC temperature has dropped to a third target temperature (420° C., for instance) which disables a sulfur purge (step 12), the sulfur purge is terminated and replaced with the temperature increase control of step 2 discussed above.

If the operating condition is within a high rpm, high load region which provides a high exhaust temperature and allows the LNC temperature suitable for a sulfur purge to be maintained without a post fuel injection in step 3 and it is determined that the output value of the LNC temperature sensor 29 has reached the second target temperature in step 14, a feedback control of the main fuel injection is carried out during each intake stroke according to an exhaust air fuel ratio target value corresponding to the actual temperature of the LNC 9 in a similar manner as the feedback control of the post fuel injection discussed above. Thereby, an optimum LNC temperature (500° C.) suitable for a sulfur purge process in a prescribed rich environment is maintained (step 15).

As a change in the amount of the main fuel injection changes the output torque of the engine E, it is desirable to limit the change in the target air fuel ratio to such a range that keeps the torque change within a tolerable range or to compensate the toque change with the boost pressure control of the turbocharger.

If it is determined that the output value of the LNC temperature has not reached the second target temperature in step 14, the temperature is increased by executing an intermittent lean control with respect to the main fuel injection in a similar manner as that in step 11 (step 16). In this case also, if it is determined that this intermittent lean control has failed to increase the temperature, and the LNC temperature has dropped to a third target temperature (420° C., for instance) which disables a sulfur purge (step 17), the sulfur purge is terminated and replaced with the temperature increase control (step 18).

The foregoing process is repeated until the completion of the sulfur purge (step 19) which can be judged from the cumulative duration of the temperature suitable for a sulfur purge or the prescribed rich environment, or the outputs of the O$_2$ sensors that are provided on the upstream and downstream ends of the LNC 9.

In short, according to the control action of the present invention, when the temperature of the LNC 9 is at an optimum value (500° C.), the exhaust air fuel ratio target value for executing a sulfur purge is selected at a level slightly richer than the optimum value or the stoichiometric value. When the temperature is higher than the optimum value, the heat generating reaction is reduced by shifting the air fuel ratio target value toward a richer side and reducing the supply of O$_2$. When the temperature is lower than the optimum value, the heat generating reaction is promoted by shifting the air fuel ratio target value toward a leaner side and increasing the supply of O$_2$. At such a time, the exhaust air fuel ratio control selects the main fuel injection and post fuel injection depending on the load condition of the engine.

If the target LNC temperature (450° C. or higher) cannot be maintained with the feedback control of a prescribed air fuel ratio range in an environment richer than the stoichiometric ratio, the intermittent lean control is started so that the temperature may be increased by a temporary increase of O$_2$ which promotes a heat generating reaction, and a sulfur purge is executed in a rich environment. If the LNC has dropped below a temperature level (420° C. or lower) that disables a sulfur purge in spite of such control actions, the sulfur purge is terminated and a temperature increase control is initiated. Once a temperature (500° C.) that enables a sulfur purge is reached, the sulfur purge is resumed.

Although the present invention has been described in terms of preferred embodiments thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. A control device for an internal combustion engine provided with a NOX catalytic converter in an exhaust passage thereof, comprising:

a temperature sensor for detecting a temperature of the NOx catalytic converter;

an air fuel ratio detector for detecting an exhaust air fuel ratio in the catalytic converter;

a fuel injection control unit configured to control an amount of fuel injection; and an engine control unit configured to compute a target exhaust air fuel ratio according to an output of the temperature sensor and forwarding a command to the fuel injection control unit so as to make an output of the air fuel ratio detector agree with the target exhaust air fuel ratio, wherein the engine control unit is configured to intermittently change the target air fuel ratio to a leaner value when an output of the temperature sensor indicates a temperature higher than a first target temperature but lower than a second target temperature.

2. The control device according to claim 1, wherein the engine control unit is configured to control an amount of a main fuel injection.

3. The control device according to claim 1, wherein the engine control unit is configured to control an amount of a post fuel injection.

4. The control device according to claim 1, wherein the engine control unit is configured to execute a temperature increase control based on any combination of delaying a main fuel injection, increasing an amount of post fuel injection and reducing an intake flow rate when an output of the temperature sensor indicates a temperature lower than a first target temperature.

5. The control device according to claim 1, wherein the target air fuel ratio is intermittently changed by controlling a main fuel injection.

6. The control device according to claim 1, wherein the target air fuel ratio is intermittently changed by controlling a post fuel injection.

7. A method for controlling a sulfur purge in an internal combustion engine provided with a NOX catalytic converter in an exhaust passage thereof, comprising:
- detecting a temperature of the NOx catalytic converter;
- detecting an exhaust air fuel ratio in the catalytic converter;
- computing a target exhaust air fuel ratio according to a detected temperature of the NOx catalytic converter;
- controlling a fuel injection vale so as to make an actual exhaust fuel ratio agree with the target exhaust air fuel ratio; and
- intermittently changing the target air fuel ratio to a leaner value when the detected temperature is higher than a first target temperature but lower than a second target temperature.

8. The control method according to claim 7, wherein controlling the fuel injection valve comprises controlling a main fuel injection thereof.

9. The control method according to claim 7, wherein controlling the fuel injection valve comprises controlling a post fuel injection thereof.

10. The control method according to claim 7, further comprising executing a temperature increase control based on any combination of delaying a main fuel injection, increasing an amount of post fuel injection and reducing an intake flow rate when the detected temperature is higher than a first target temperature.

11. The control method according to claim 7, wherein the target air fuel ratio is intermittently changed by controlling a main fuel injection.

12. The control method according to claim 7, wherein the target air fuel ratio is intermittently changed by controlling a post fuel injection.

13. A non-transitory computer-readable medium encoded with computer-executable instructions for performing a method for controlling a sulfur purge in an internal combustion engine provided with a NOX catalytic converter in an exhaust passage thereof, the control method comprising:
- detecting a temperature of the NOx catalytic converter;
- detecting an exhaust air fuel ratio in the catalytic converter;
- computing a target exhaust air fuel ratio according to a detected temperature of the NOx catalytic converter;
- controlling a fuel injection valve so as to make an actual exhaust fuel ratio agree with the target exhaust air fuel ratio; and
- intermittently changing the target air fuel ratio to a leaner value when the detected temperature is higher than a first target temperature but lower than a second target temperature.

14. The computer-readable medium according to claim 13, wherein controlling the fuel injection valve comprises controlling a main fuel injection thereof.

15. The computer-readable medium according to claim 13, wherein controlling the fuel injection valve comprises controlling a post fuel injection thereof.

16. The computer-readable medium according to claim 13, wherein the method further comprises executing a temperature increase control based on any combination of delaying a main fuel injection, increasing an amount of post fuel injection and reducing an intake flow rate when the detected temperature is higher than a first target temperature.

17. The computer-readable medium according to claim 13, wherein the target air fuel ratio is intermittently changed by controlling a main fuel injection.

18. The computer-readable medium according to claim 13, wherein the target air fuel ratio is intermittently changed by controlling a post fuel injection.

* * * * *